2 Sheets—Sheet 1.
D. G. LITTLEFIELD.
Magazine Stove.
No. 1,426. Reissued March 3, 1863.
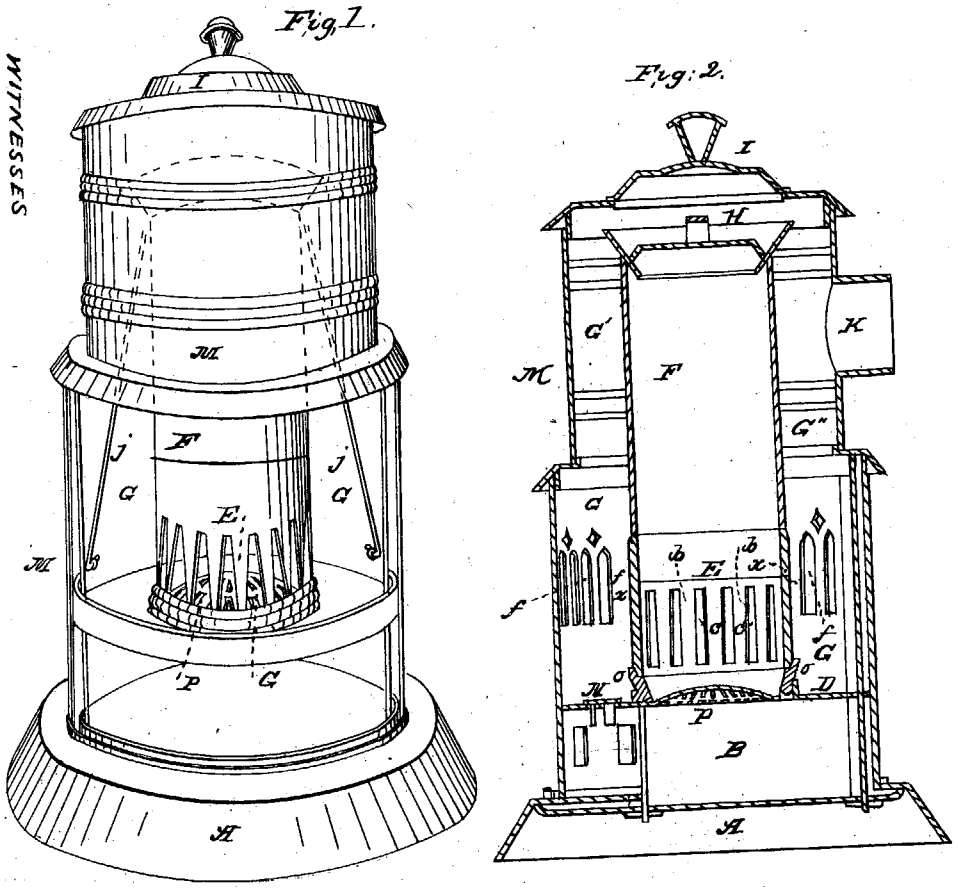
WITNESSES
Franklin Pratt
Marcus B. Norton
INVENTOR
Dennis G. Littlefield
N. PETERS, Photo-Lithographer, Washington, D. C.

2 Sheets—Sheet 2.
D. G. LITTLEFIELD.
Magazine Stove.
No. 1,426.
Reissued March 3, 1863.
Fig: 9,
Vertical Section
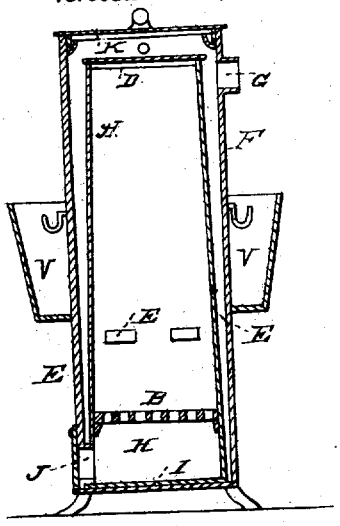
Fig: 3.
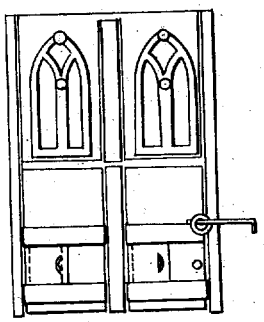
Fig: 10,
Horizontal Section.
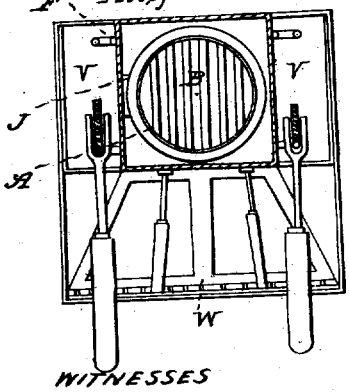
Fig: 11,
Front elevation of the Stove
Figs: 9+10
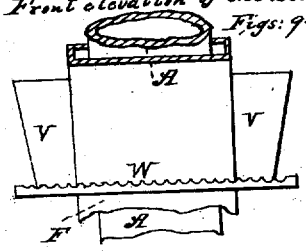
WITNESSES
Franklin Pratt
Marcus P. Norton
INVENTOR
Dennis G. Littlefield.
N. PETERS, Photo-Lithographer, Washington, D. C.

UNITED STATES PATENT OFFICE.

DENNIS G. LITTLEFIELD, OF ALBANY, NEW YORK.

IMPROVEMENT IN STOVES.

Specification forming part of Letters Patent No. 10,448, dated January 24, 1854; Reissue No. 1,237, dated November 19, 1861; Reissue No. 1,334, dated August 26, 1862; Reissue No. 1,426, dated March 3, 1863.

DIVISION NO. 1.

*To all whom it may concern:*

Be it known that I, DENNIS G. LITTLEFIELD, of the city of Albany, in the county of Albany and State of New York, did, on the 24th day of January, 1854, obtain of and from the United States of America certain Letters Patent for and upon a new method of constructing that class of stoves using a supplying-cylinder for reserve coal, which said patent was reissued in two separate divisions or patents, on the 19th day of November, 1861, and which last two mentioned patents were again reissued in four divisions on the 26th day of August, 1862; and I do hereby declare that the following is a full and exact description of said invention, reference being had to the accompanying drawings, making part of this specification.

Stoves for burning anthracite and other coals, coke, &c., have been contrived in which a supplying-cylinder for reserve coal has been applied immediately over the fire-pot in such a position that, as the fuel at the base of the mass is consumed that in the supplying-cylinder descends and takes its place. Such a stove can be found in the English patent of Stephen Joyce, enrolled February 21, 1840, and a reference thereto will serve to indicate the distinctive features of my improvements more clearly and forcibly.

In one respect my improved stove and that of Joyce are identical—viz., the supplying-cylinder and the fire-pot upon which it rests are surrounded by a case forming a chamber for the reception of the products of combustion as they issue through the perforations in the fire-cylinder or fire-pot, but in other respects their constructions differ essentially.

My improvements have reference to three parts of the stove: First, an effectual adaptation of the supplying-cylinder to avoid explosions, and permit a more perfect regulation of the stove's action; second, the construction of an illuminating exterior case to the heating-chamber, that the stove may give light to the apartment and heat by direct radiation from the fire itself, as well as by conduction from its surfaces; and, third, a peculiar construction of the fire-pot, making it more effective in use and less expensive to manufacture.

In the aforesaid stove of Joyce the exterior case inclosed only the sides (more or less) of the supplying-cylinder and the fire-pot, whereas with my improvements it also extends up and surrounds the top as well as the sides of the supplying-cylinder, the advantage of which construction is that no air can pass into said cylinder at the top when the stove is in operation, but whatever air enters in at the cover-opening through the outer casing will necessarily pass, in connection with the products of combustion, immediately to the exit-flue, that being the vacuous space. It has been found in practice that a supplying-cylinder thus protected may be carried to any height required, in order to contain a large quantity of supply coal, without any liability to explosions, or to the fuel becoming ignited above the perforations through the fire-pot; whereas it is unsafe so to construct a supplying-cylinder having the opening for the supply of coal communicate directly with the external atmosphere, as such a construction not only prevents the successful operation of the stove in respect to the amount of coal ignited, but is liable at times when the coal supplied is wet or of a poor quality, so as to generate hydrogenated gases, to cause explosions, as, whenever the air passing up through the bottom grate is partially or wholly cut off the vacuous space of the chimney-flue is unsupplied with its expected current through the regular channel, to meet which deficiency atmospheric air is liable to be drawn in at the cover-opening to such cylinder, though said cover may be fitted very perfectly, and this air, communicating with the gases therein, would cause an explosion, and ultimately the whole mass of supply-coal would become ignited.

Another advantage of my improvement is that an ordinary cover to the supplying-cylinder can be used and answer a better purpose than if it were fitted perfectly tight, as such cover being surrounded by the flue of the stove it will permit the accumulated light gases to pass off from under said cover without establishing a current in that direction, so that such gases do not pass down through the fire to rob the carbon of its oxygen, as would be the case were said cover gas-tight.

Neither in the stove of Joyce nor in any stove with which I am acquainted employing a supplying-cylinder for the reserve fuel and a space or chamber into which the products of combustion and the light and heat from the burning fuel are caused to pass has there been constructed an illuminating exterior case or wall to such space or chamber, thereby permitting the stove to give light to the apartment and heat by radiation from the fire itself as well as by conduction from the stove's surfaces. The advantage of such construction is of a threefold nature. First, it exposes to view the condition of the fire, whether or not it is operating in a proper manner; second, it permits the fire to burn at a higher temperature without injury to the interior construction, because more heat passing by direct radiation less is retained to act upon those surfaces; and, third, a better quality of heat is furnished, it being well known that radiant heat direct from the fire itself imparts a warmth and cheerfulness that cannot be experienced from a heating-surface where there is no light, or the cause of such heat is not perceptible to the eye.

In the stove with which I have compared my improved stove the fire-pot was perforated to permit the flame to pass through into a chamber surrounding it, so that the unconsumed gases might be ignited in contact with the burning coals; but those perforations were so few and small, and so remote from the grate at the bottom, they would not permit a full and complete combustion to take place, and, consequently, the partially-consumed coals at the base were liable to become cool and extinguished; whereas with my improved construction having the perforations of large capacity and extending from near the grate upward as high as it is desirable to ignite the coal the gases from the supply-coal, and also from the incandescent coal, are burned in conjunction, and entirely down to the bottom, thereby aiding in the combustion of the refractory and partially-consumed coal at that point which will enable anthracite and other concentrated fuels to be burned, and that with such rapidity as may be required for every occasion; for in order to burn anthracite and other concentrated fuels upon the principles of this class of stoves it is necessary to have the perforations or outlet-spaces from the fire-pot into the chamber which receives the products of combustion sufficiently capacious to allow a free passage to all those products of combustion and of the gases generated in the supplying-cylinder, which products in said concentrated fuel are greatly augmented on account of the corresponding large amount of air required to supply the necessary oxygen to the fuel, and this large outlet capacity is rendered still more essential to insure the proper working of the supplying-cylinder, and of the chamber inclosing its cover-opening, in order to obviate any tendency to establish a draft upward through the supply coal, which effect would necessarily result in the ignition of all of said coal in the supplying-cylinder.

To enable those skilled in the art to carry my invention into practice, I will now proceed to describe the construction of a stove (shown in the accompanying drawings) which combines these improvements.

Figure 1 is a view of a cylindrical stove, a part of the outer cylinder being removed. Fig. 2 is a central vertical section of the same, showing the arrangement of the various parts of the stove herein described.

Like letters represent and refer to like or corresponding parts in both figures.

A is the base of the stove, immediately above which is the ash-pit B. D is the bed-plate, which forms the floor of a chamber, G, having a cylindrical opening in the center, whereon is placed the fire-pot E′, which rests upon a ring, O. This ring has a flange projecting up a short distance outside of the lower part of the fire-pot, to keep the same in place, and itself rests upon the bed-plate D within a flange, to keep it in place. This ring should be about twice the depth of the average diameter of the coal to be burned, and consequently varies with the size thereof. The fire-pot E is perforated so as to form open spaces *c c* of a peculiar form, the portions remaining being in the form of bars *b b*, which are wider at the top than at the bottom, so that the perforations *c c* between them are widest at the bottom. This form of the perforations tends to draw the flame of the burning gases lower down, and thereby cause the hottest part of the fire to be at the bottom of the coal. The height of the perforations *c c* should be proportioned to the diameter of the fire-pot, (about one-half thereof,) for should they exceed a certain limit the coal at the base would be too far from the influence of the burning gases, which tend to pass through the upper part of the perforations, and thus one object of this improvement might be defeated. The perforations should have an aggregate area of outlet-space into chamber G at least greater than that of the aggregate air-supplying openings or spaces through the grate below, in order to permit sufficient and free passage of all the products of combustion and generated gases into said chamber through the said outlets. The grate at the bottom of this fire-pot rests upon the bed-plate D on a line with the bottom of the ring O, and may be made in the form represented, or of such other form as will answer the purpose.

F is the supplying-cylinder, which is placed immediately over and upon the top of the fire-pot E, to which it is accurately fitted and held in place by rods *j j*, Fig. 1. It has a cover, H, which is to be kept closed when the stove is in operation.

Surrounding the above-described fire-pot and supplying-cylinder is an exterior casing, M M, which forms the chamber G, which chamber extends up and surrounds the top of the supplying-cylinder, or at least entirely incloses the cover, opening thereof, thereby permitting the products of combustion to pass over the top of the supplying-cylinder on their course to the exit-flue. The casing M M has openings *f f* around its whole periphery, glazed with mica, (or "isinglass,") thereby producing an illuminating-chamber, and thus, when the stove is in operation, it presents the cheerful appearance of an open fire. There should be great care in constructing these illuminating-spaces so that no air can pass into said chamber through them, since the air thus admitted not only would counteract the current passing up from the ash-pit to support combustion within the fire-pot, but it would also cool the stove by mixing with the heated products of combustion and reducing their temperature. There may be doors (one of which is shown at Fig. 3) opening into chamber G, if thought best in practical use, and these may be provided with windows or illuminating-apertures. There is a cover, I, at the top of said chamber, which is to be removed when the supplying-cylinder requires replenishing.

K is the exit-flue which leads to the smoke-pipe, and may be placed at the side near the top, as shown in the drawings, or at such other point as may be preferred.

I will now proceed to describe the operation of a stove combining these improvements. The fire is kindled within the fire-pot E, having the cover H open, so as to permit the smoke to pass from the top of the supplying-cylinder and avoid smoking the windows *f f* while igniting the kindlings. The said kindlings may be permitted to burn in this manner for a short time, or until the smoke shall have passed off and they are thoroughly ignited, when the supplying-cylinder may be filled with coal and the cover H closed. As combustion takes place all the coal within the fire-pot up to a point just above the perforations *c c* becomes ignited. The gases and products of imperfect combustion which are collected within the supplying-cylinder and the fire-pot will pass therefrom in an ignited state at said perforations, aiding thereby in keeping up a vivid combustion in those perforations, which, extending down nearly to the grate, aid in the combustion of the incandescent coal upon said grate. The products of combustion and of the gases thus utilized pass up the chamber G, which chamber surrounding the top of the supplying-cylinder, they are free to pass over the same on their course to the exit-flue K, which flue, tending to empty the chamber G, and the generation of gases from the supply coal tending to fill the supplying-cylinders, any air that may enter into chamber G at the cover I will pass, in connection with the products of combustion, to the said exit-flue K, and will not enter the supplying-cylinder at all when the stove is in operation.

I am aware that Joyce in his said invention has described a small stove for heating book-binders' tools, (shown in Figs. 9, 10, and 11 of the drawings accompanying his English patent,) wherein the said stove, when put into its case, has the semblance of a stove provided with a chamber surrounding not only the ash-pit, fire-pot, and supplying-cylinder at the sides, but extending up so as to surround the top of the supplying-cylinder; but that stove does not reach, either in conception or actual construction, the realization of my improvements as above set forth, and for the purposes intended to be accomplished by them, as a reference to his figures and description will show.

I will here quote from Joyce's specification the portion relating to that part of his invention:

"Fig. 9 is a vertical section, and Fig. 10 a horizontal section, and Fig. 11 a portion of an elevation of a small stove for the use of book-binders to give heat to their tools.

"The parts of the stove as far as they resemble those of Figs. 1 and 2, already described, are denoted by the same letters of reference. The several parts which are different are as follows: The frustum A A, which contains the fuel, has the fire-grate B fitted into its lower end to sustain the fuel, leaving a space, H, beneath the grate B and above the close bottom I for the ash-pit, into which air is admitted through a slide-spout, J, Figs. 9 and 10, which projects out from the lower part of the frustum A at one side thereof, and enters into a corresponding opening in the external case, F F, which opening is provided with a sliding door, by which the admission of air can be regulated. The whole of the frustum A A, with its contents, can be lifted out from the external case, F F, in order to light the fire and to charge it with fuel. The cover D at the top of the frustum is within the cover K of the external case, F F.

"The action of the stove is the same as that of Figs. 1 and 2, already described. The apertures E E are small and few, because only a gentle heat is required. The vent G proceeds from the upper part of the case F F. On each side of the case F F troughs V V are fixed to receive the book-binders' or other tools which are to be heated, and in front a supporting rail or rack, W, is fixed to sustain the handles of other small tools, which may be applied with their ends against the front of case F F to receive heat therefrom.

"The same or a similar stove may be used by other trades requiring a gentle heat to small tools."

And the seventh clause of his claims sets forth the purpose of the improvement as follows:

"7. The improvement in stoves, such as Figs. 9, 10, and 11, for communicating a gentle heat to the small tools used by book-binders and others, as hereinbefore described."

The above extracts show that the arts, by that device, were not advanced beyond the construction of a small furnace, to be fired up when out of its case, and to be placed therein for the specific purpose of applying a more gentle heat to the tools of book-binders and other trades and of conveying the products of combustion to the chimney-flue. The apertures in the fire-pot were "small and few because only a gentle heat is required." But such a construction of the fire-pot would render a stove or furnace for burning concentrated fuels ineffectual, if not inoperative, since it is necessary to have the combustion-apertures or outlets of the fire-pot embrace an aggregate area at least larger than that of the grate apertures for the supply of air to the fuel, as before explained. Hence it necessarily follows that with so few and small combustion-apertures as Joyce directed to be made in the stove referred to being much less in area than that of the grate-openings the entire products of combustion could not find a free passage through them, and, consequently, the combustion would be stifled or some of the products would be forced upward through the supply-coal and the cover-opening of the supplying-cylinder, if any opening should be offered for their passage, the result of which action would be that the fuel could not be burned; or, if combustion should continue, the whole mass of coal in the supplying-cylinder would become ignited and consumed therein.

The stove itself was really distinct from the case, which furnished a suitable apparatus to hold the tools and apply the heat thereto properly. It was evidently merely incidental to the construction that the cover of the heater or "frustum" was inclosed within the outer case, since all the other, the principal arrangements of his invention, had the supplying-cylinder project out of the surrounding chamber. The fact that the inventor directed the heater or frustum to be taken out of the case in order to light the fire and charge it with fuel shows that the case was not a necessary part of the stove proper, and that the two combined as a single inseparable invention had not been conceived nor accomplished by him. A stove or furnace permanently connected as an individual whole for the general purpose of supplying artificial heat to apartments and combining the improvements which constitute the important features of my invention was not produced thereby, and could not be produced therefrom, without the exercise of invention in every particular of my improvements. Therefore, while I entirely disclaim the whole construction described in the said stove of Joyce, operating in the manner and for the purpose set forth by him, yet I do claim to their full extent the features of my improvements which I have described and exemplified in the foregoing specification, and the substance and scope of which I shall now set forth in my claims.

What I claim as my invention, and desire to secure by Letters Patent, is—

1. A stove or furnace having a supplying cylinder or reservoir over the fire-pot, and a chamber for receiving the products of combustion, arranged so as to inclose the cover-opening of the supplying-cylinder when the fire-pot is constructed with openings or outlet-space to said chamber sufficient in area to enable anthracite coal and other concentrated fuels to be burned, and to transmit all the products of combustion and generated gases freely to said chamber.

2. The combination of a chamber for receiving the products of combustion so arranged as to inclose the cover-opening of the coal-supplying cylinder with a fire-pot which has an aggregate area of openings or outlet-space to said chamber exceeding that of the air-supply apertures through the fire-grate below.

DENNIS G. LITTLEFIELD.

Witnesses:
J. S. BROWN,
F. A. FOLLETT.